United States Patent
Benco et al.

(10) Patent No.: US 8,126,436 B2
(45) Date of Patent: Feb. 28, 2012

(54) NETWORK SUPPORT FOR VOICE MAIL PREEMPTION

(75) Inventors: David S. Benco, Winfield, IL (US); Reem M. Pashan, St. Charles, IL (US)

(73) Assignee: Alcatel Lucent, Paris (FR)

( * ) Notice: Subject to any disclaimer, the term of this patent is extended or adjusted under 35 U.S.C. 154(b) by 921 days.

(21) Appl. No.: 11/811,807

(22) Filed: Jun. 12, 2007

(65) Prior Publication Data
US 2008/0311887 A1    Dec. 18, 2008

(51) Int. Cl.
*H04M 11/10* (2006.01)
(52) U.S. Cl. .... 455/413; 379/80; 379/88.16; 379/88.26; 379/142.11; 379/142.17
(58) Field of Classification Search .................. 455/413; 379/80, 88.16, 88.26, 142.11, 142, 17
See application file for complete search history.

(56) References Cited

U.S. PATENT DOCUMENTS

| | | | | |
|---|---|---|---|---|
| 5,600,703 A * | 2/1997 | Dang et al. | .................. | 340/7.22 |
| 5,668,862 A * | 9/1997 | Bannister et al. | ........ | 379/207.14 |
| 6,006,189 A * | 12/1999 | Strawczynski et al. | ........ | 704/270 |
| 6,014,436 A * | 1/2000 | Florence et al. | ......... | 379/211.01 |
| 6,879,682 B1* | 4/2005 | Nguyen et al. | ................ | 379/230 |
| 2003/0147511 A1* | 8/2003 | Silver et al. | ................ | 379/88.22 |
| 2005/0041787 A1* | 2/2005 | Casey et al. | ................ | 379/88.18 |
| 2010/0091956 A1* | 4/2010 | Gopal | ........................ | 379/88.12 |

* cited by examiner

*Primary Examiner* — Nimesh Patel
(74) *Attorney, Agent, or Firm* — Carmen Patti Law Group, LLC

(57) ABSTRACT

An apparatus in one example has: a mobile terminal operatively coupled to a mobile switching center; a subscriber database operatively coupled to the mobile switching center; a first terminal operatively coupled to the mobile switching center; a voice mail system operatively coupled to the mobile switching center; and a voice mail functionality whereby a voice mail message is created from the first terminal, and whereby the first terminal is accessible from a mobile terminal at least during a period in which the voice mail message is being created.

24 Claims, 4 Drawing Sheets

NETWORK SUPPORT FOR VOICE MAIL PREEMPTION

TECHNICAL FIELD

The invention relates generally to telecommunication networks, and more particularly to a telecommunication network that provides the ability for a wireless subscriber to access a calling party during a period in which a voice mail message is being created.

BACKGROUND

The traditional answering machine elevated the art by offering a method to leave messages for a caller when the called party was unavailable to answer the telephone. Voice messages were available for replay at the answering machine by the called party, and later systems allowed remote playback over the telephone line. Subsequently, voice mail services were created which required no user-premise equipment and allowed for remote access by the called party. These voice mail systems are particularly popular with mobile subscribers.

However, voice mail systems are inferior to the traditional answering machine in one respect. They do not allow for real-time screening of incoming calls. Although other mechanisms exist to identify the caller (such as CallerID), those systems can be rendered ineffective either inadvertently or deliberately. For example, the CallerID display for incoming international calls often appears as "Unknown". Also, CallerID service can be blocked by the caller, resulting in a display such as "Blocked" or "Private". There are legitimate reasons for blocking the originating number when calls originate from abuse shelters, etc.

Thus, there is a need for an improved method that provides the ability for a wireless subscriber to access a calling party during a period in which a voice mail message is being created.

SUMMARY

One implementation encompasses an apparatus. This embodiment of the apparatus may comprise: a mobile terminal operatively coupled to a mobile switching center; a subscriber database operatively coupled to the mobile switching center; a first terminal operatively coupled to the mobile switching center; a voice mail system operatively coupled to the mobile switching center; and a voice mail functionality whereby a voice mail message is created from the first terminal, and whereby the first terminal is accessible from a mobile terminal at least during a period in which the voice mail message is being created.

Another implementation encompasses a method. This embodiment of the method may comprise: creating a voice mail message from a first terminal; and accessing the first terminal from a mobile terminal at least during a period in which the voice mail message is being created

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Embodiments according to the present method and apparatus provide a means for a wireless subscriber, such as a mobile terminal or cell phone, to access a calling party, such as a wired telephone or another mobile terminal, during a period in which a voice mail message is being created.

Embodiments according to the present method and apparatus support real-time call screening in conjunction with voice mail systems. In general terms according to an embodiment of the present method and apparatus a call may be placed to a mobile terminal of a wireless subscriber who utilizes a voice mail service and has subscribed to a voice mail preemption feature. The called party's mobile terminal rings as normal. It stops ringing when the voice mail greeting is played to the calling party.

At any time during the greeting or during the period in which the caller is leaving a message, the called party may initiate a listen-only connection to the caller by pressing a hot key on the mobile terminal. Other means for initiation may be used, such as pressing a combination of buttons on the mobile terminal or using a touch screen. An optional display on the mobile handset may indicate whether the greeting is currently being played or the message is currently being recorded. The calling party is not aware that the called party is able to listen to the message in real time.

If the called party chooses to speak with the caller, a second press of the hot key on the mobile terminal will initiate a two-way voice path with the caller. After a provisionable delay, the voice mail system may be disconnected from the active call.

If the called party chooses not to speak with the caller, pressing the "End" button on the mobile handset will terminate the one-way connection and the voice mail system and caller interaction will proceed to its normal conclusion. Alternatively, if the called party waits until the caller hangs up, a two-way connection to the called party's voice mail system will automatically be set up to process the voice mail.

Figure 1:
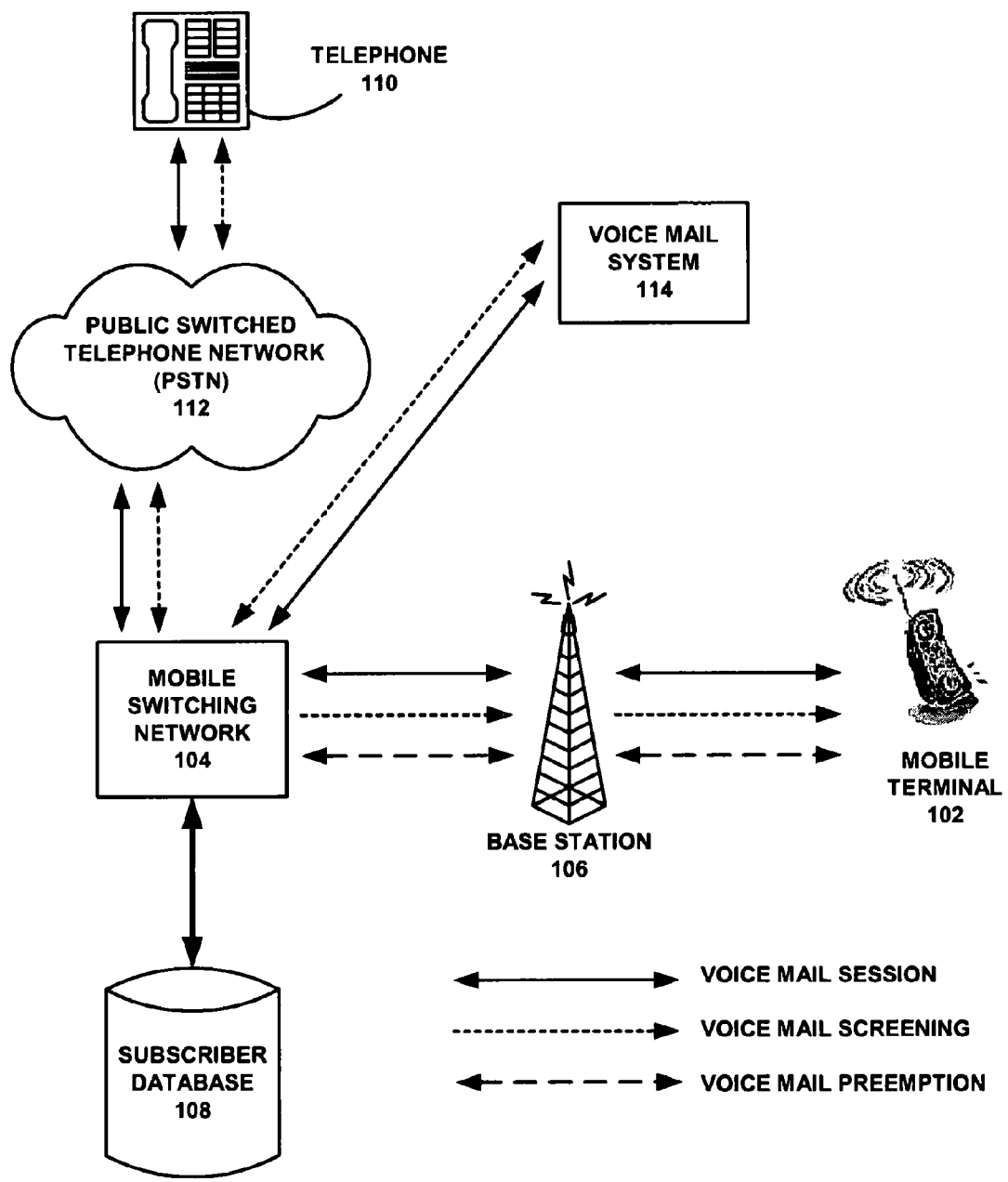
FIG. 1 is a representation of one implementation of an apparatus that provides for a wireless subscriber to access a calling party during a period in which a voice mail message is being created.

FIG. 1 is a representation of one implementation of an apparatus that provides for a wireless subscriber to access a calling party during a period in which a voice mail message is being created. A mobile terminal 102 may be operatively coupled to a mobile switching center 104 via a base station 106. A subscriber database 108 may be operatively coupled to the mobile switching center 104. A first terminal 110 may be operatively coupled to the mobile switching center 104 via a public switched telephone network (PSTN) 112. A voice mail system 114 may also be operatively coupled to the mobile switching center 104. The voice mail system 114 and the mobile switching center 104 may constitute a voice mail functionality whereby a voice mail message is created from the first terminal 110, and whereby the first terminal 110 is accessible from the mobile terminal 102 at least during a period in which the voice mail message is being created.

Figure 2:
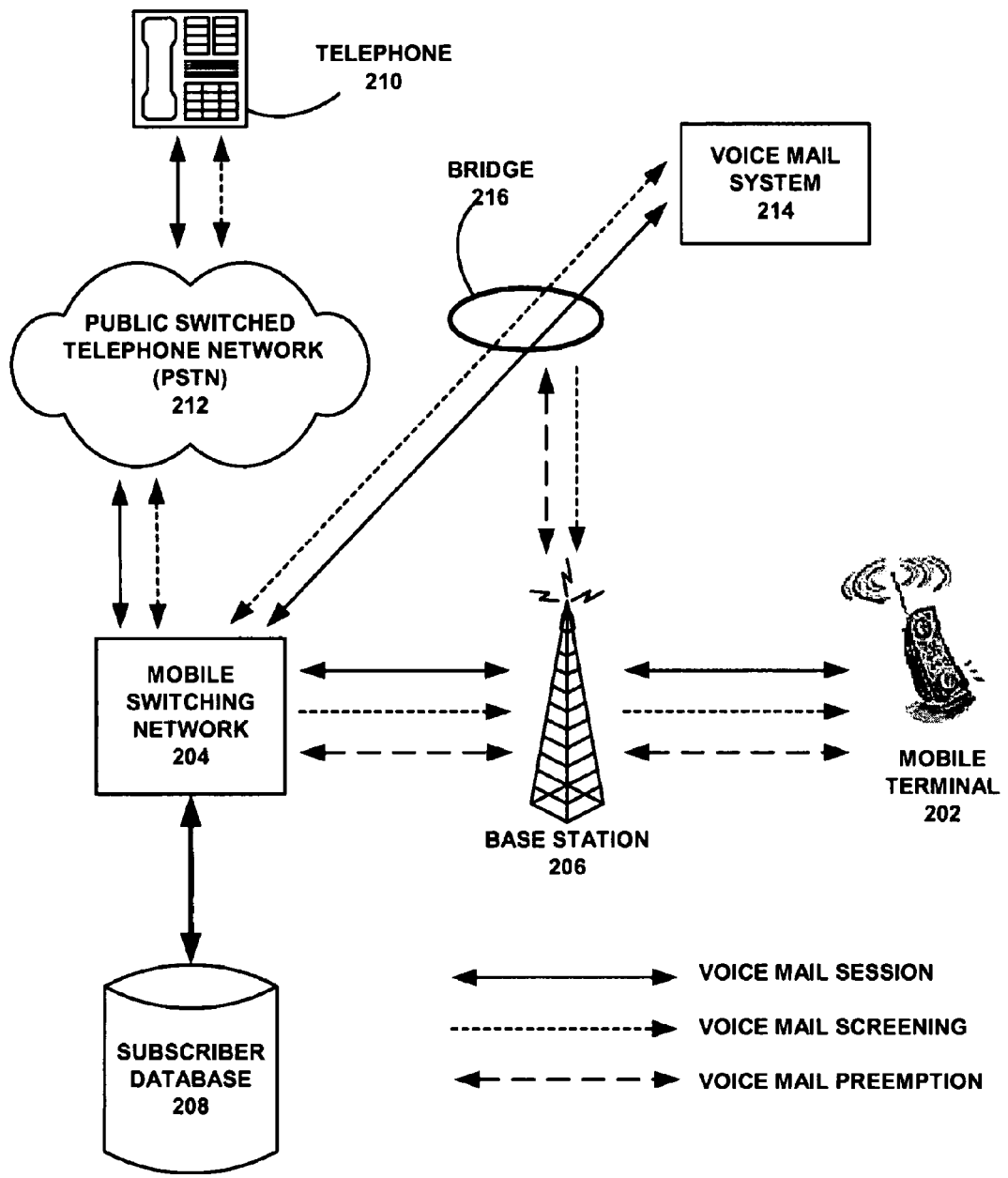
FIG. 2 is a representation of another implementation of an apparatus that provides for a wireless subscriber to access a calling party during a period in which a voice mail message is being created.

FIG. 2 is a representation of another implementation of an apparatus that provides for a wireless subscriber to access a calling party during a period in which a voice mail message is being created. A mobile terminal 202 may be operatively coupled to a mobile switching center 204 via a base station 206. A subscriber database 208 may be operatively coupled to the mobile switching center 204. A first terminal 210 may be operatively coupled to the mobile switching center 204 via a public switched telephone network (PSTN) 212. A voice mail system 214 may also be operatively coupled to the mobile switching center 204. A bridge 216 may be operatively coupled between the voice mail system 214 and the mobile switching center 204. The bridge 216 may also be operatively coupled to the mobile terminal 202 via the base station 206. The voice mail system 214, the bridge 216 and the mobile switching center 204 may constitute a voice mail functionality whereby a voice mail message is created from the first terminal 210, and whereby the first terminal 210 is accessible from the mobile terminal 202 at least during a period in which the voice mail message is being created.

Figure 3:
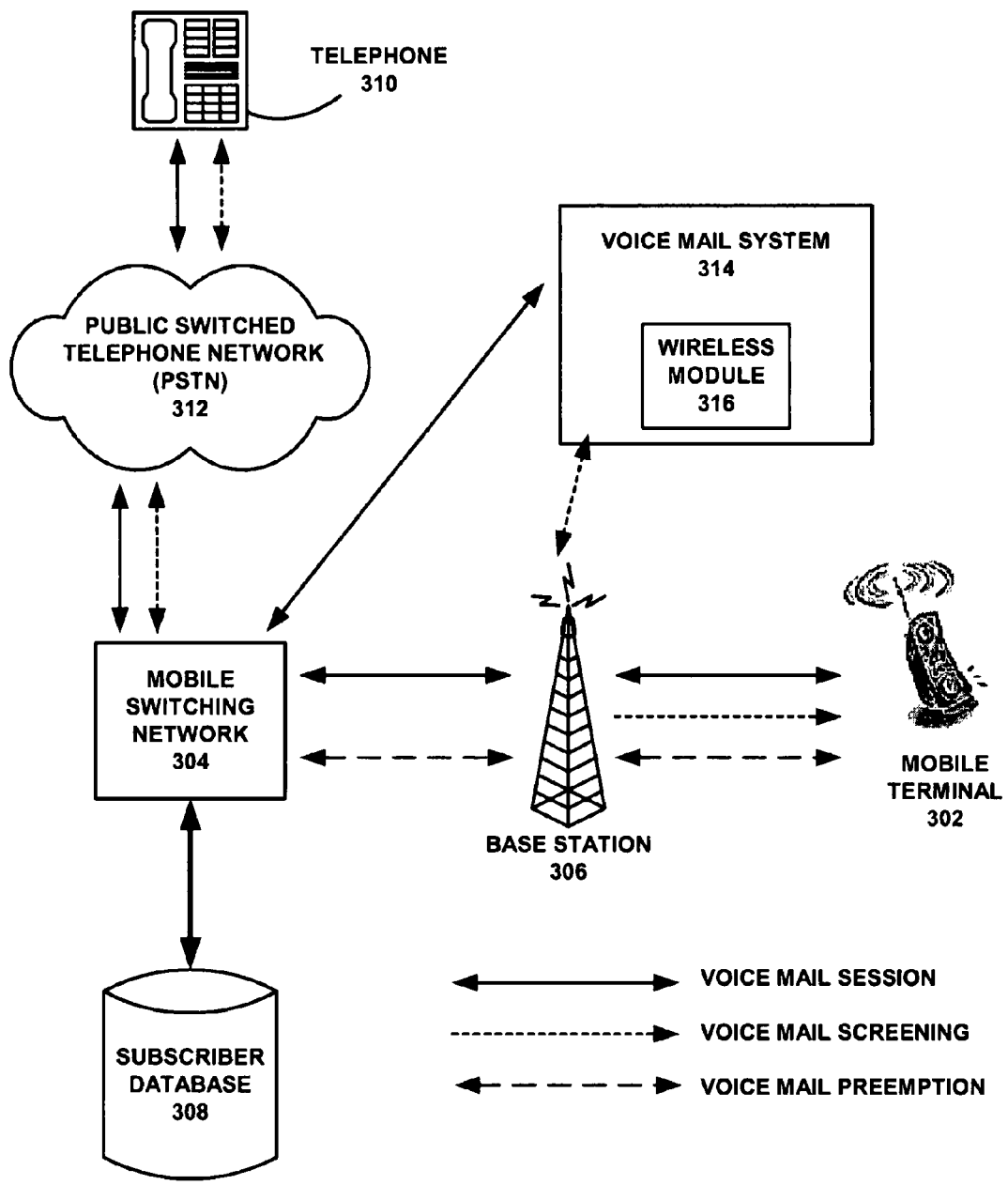
FIG. 3 is a further representation of another implementation of an apparatus that provides for a wireless subscriber to access a calling party during a period in which a voice mail message is being created.

FIG. 3 is a further representation of another implementation of an apparatus that provides for a wireless subscriber to access a calling party during a period in which a voice mail message is being created. A mobile terminal 302 may be operatively coupled to a mobile switching center 304 via a base station 306. A subscriber database 308 may be operatively coupled to the mobile switching center 304. A first terminal 310 may be operatively coupled to the mobile switching center 304 via a public switched telephone network (PSTN) 312. A voice mail system 314 may also be operatively coupled to the mobile switching center 304. The voice mail system 314 may have a wireless module 316 that allows communication with the base station 306. The voice mail system 314 via the wireless module 316 may be operatively coupled to the mobile terminal 302 via the base station 306. The voice mail system 314, and the base station 306 may constitute a voice mail functionality whereby a voice mail message is created from the first terminal 310, and whereby the first terminal 310 is accessible from the mobile terminal 302 at least during a period in which the voice mail message is being created.

The FIGS. 2 and 3 embodiments are alternatives to the FIG. 1 embodiment. These embodiments provide a direct connection from the base station to the voice mail system or conference bridge. Such a connection bypasses the mobile switching center. This requires additional logic on the base station:
a) to detect that the mobile terminal was sent a "voice message in progress" indication (but had not yet received a "voice message concluded" indication);
b) to interpret mobile terminal key presses in the context of the voice mail preemption feature (e.g., "1" to listen, "2" to connect);
c) for a database lookup or network query to determine the address of the voice mail system associated with a particular called number; and
d) to establish a connection (e.g., IP connection) from the base station to the voice mail system.

The advantages to a direct base station—voice mail connection include:
1) faster response time for mobile terminal key presses (by not requiring any mobile switching center processing); and
2) simplified mobile switching center and voice mail interfaces (e.g., for an IP connection, the base station may block traffic from the mobile terminal to the voicemail system by filtering the IP traffic at the base station vs. using specially designed one-way circuitry in the voicemail system to provide a listen-only connection to the mobile terminal).

In general terms an embodiment according to the present method and apparatus may comprise: placing a call from a first terminal to a mobile terminal; not answering the call by the mobile terminal; creating a voice mail message from the first terminal; determining if the mobile terminal is a subscriber to the preemption feature; if the mobile terminal is not a subscriber the mobile terminal may not preempt the voice mail message; if the mobile terminal is a subscriber, accessing the first terminal from a mobile terminal at least during a period in which the voice mail message is being created.

Figure 4:
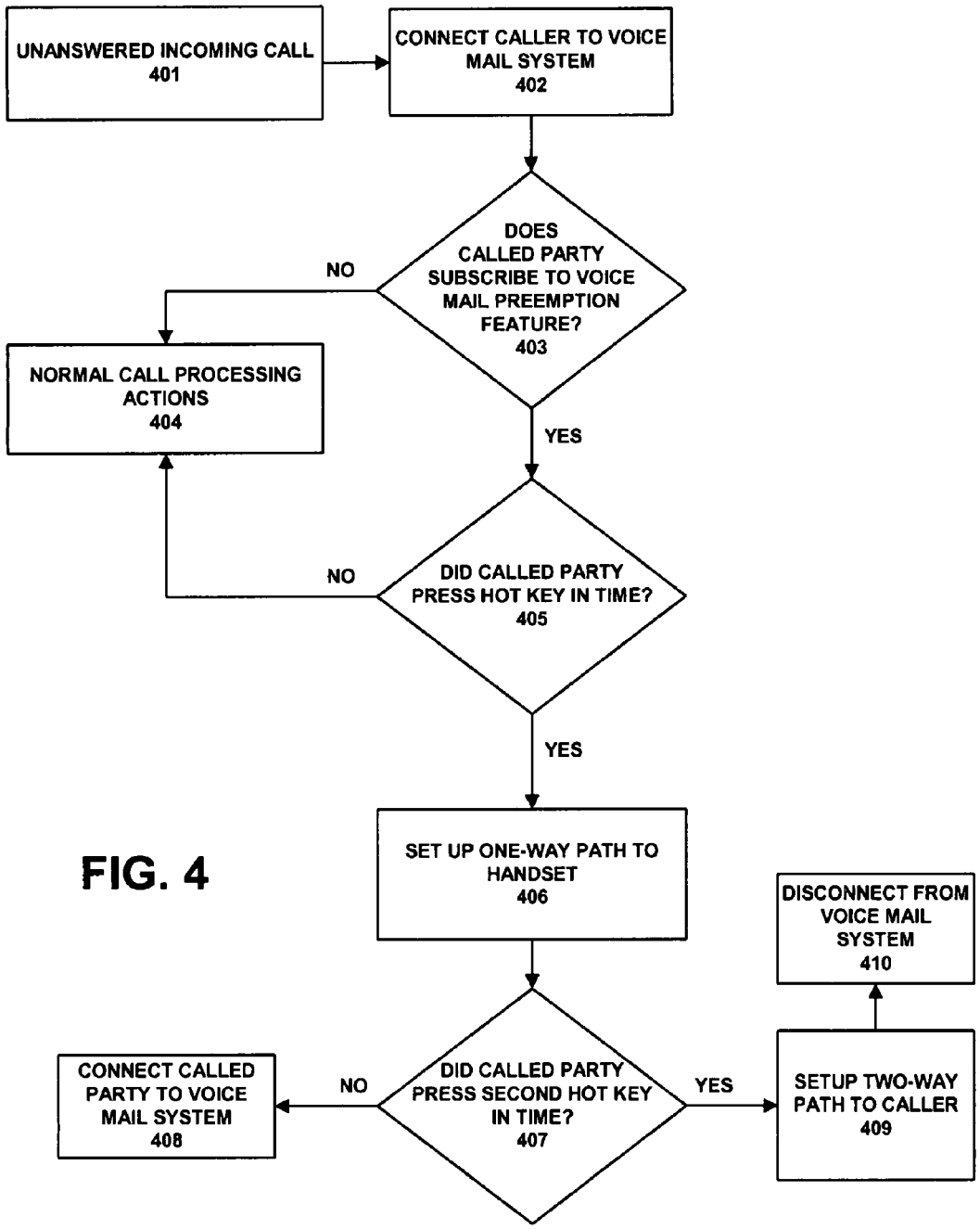
FIG. 4 is a representation of one exemplary flow diagram for a method that provides for a wireless subscriber to access a calling party during a period in which a voice mail message is being created.

FIG. 4 is a representation of one exemplary flow diagram for a method that provides for a wireless subscriber to access a calling party during a period in which a voice mail message is being created. This embodiment of the method may comprise: identifying an unanswered incoming call (401); connecting the caller to a voice mail system (402); does the called party subscribed to the voice mail preemption feature (403); if no, normal call processing actions (404); if yes, did the called party press the hot key on the mobile terminal in time (405); if no, normal call processing actions (404); if yes, setting up one-way path to the mobile terminal (406); did called party press second hot key in time (407); if no, the called party is connected to the voice mail system (408); if yes, setting up a two-way path to the first terminal (409); and disconnecting from the voice mail system (410).

The present apparatus in one example may comprise a plurality of components such as one or more of electronic components, hardware components, and computer software components. A number of such components may be combined or divided in the apparatus.

The present apparatus in one example may employ one or more computer readable signal bearing media. The computer-readable media may store software, firmware and/or assembly language for performing one or more portions of one or more embodiments. Examples of a computer-readable medium for the apparatus may comprise the recordable data storage medium (subscriber database). The computer-readable medium for the apparatus in one example may comprise one or more of a magnetic, electrical, optical, and atomic data storage medium. For example, the computer-readable medium may comprise floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method of operating a base station, comprising the steps of:
   establishing a wireless connection from the base station to a wireless module of a voice mail system, wherein a voice mail message is being created on the voice mail system, and wherein the wireless connection bypasses a mobile switching center connected to the base station and does not require processing by the mobile switching center; and accessing a first terminal used to create the voice mail from a mobile terminal at least during a period in which the voice mail message is being created, wherein the mobile terminal is connected to the base station.

2. The method according to claim 1, wherein a greeting precedes the voice mail message, and wherein at any time during the greeting or during a following period in which the first terminal is leaving a message, a listen-only connection from the mobile terminal to the first terminal is initiatable via activation of a hot key or using a touch screen on the mobile terminal.

3. The method according to claim 2, wherein the method further comprises the step of providing an indication as to whether the greeting is being played or the message is being recorded.

4. The method, according to claim 2, wherein if the mobile terminal is to communicate with the first terminal, the method further comprises the step of initiating a two-way voice path with the first terminal via a second activation of the hot key on the mobile terminal.

5. The method according to claim 4, wherein the step of creating a voice mail message occurs in a voice mail system that is operatively coupled to the first terminal, and wherein after a provisionable delay, the method further comprises the step of disconnecting the voice mail system from the first terminal.

6. The method according to claim 2, wherein if a decision is made for the mobile terminal not to establish communication with the first terminal, the method further comprises the step of activating an "End" button on the mobile handset to terminate the listen-only connection.

7. The method according to claim 2, wherein the step of creating a voice mail message occurs in a voice mail system that is operatively coupled to the first terminal, and wherein if the mobile terminal waits until the first terminal hangs up, the method further comprises the step of automatically setting up a two-way connection to the voice mail system to process the voice mail.

8. The method according to claim 1, wherein the first terminal is not aware that the mobile terminal is able to listen to the creation of the voice mail message in real time.

9. A network, comprising:
a mobile terminal operatively coupled to a mobile switching center via a base station;
a subscriber database operatively coupled to the mobile switching center;
a first terminal operatively coupled to the mobile switching center;
a voice mail system operatively coupled to the mobile switching center; and
a voice mail functionality whereby a voice mail message is created from the first terminal, and wherein the first terminal is accessible from the mobile terminal via a wireless connection from the base station to a wireless module of the voice mail system, and wherein the wireless connection bypasses the mobile switching center and does not require processing by the mobile switching center, and wherein the voice mail message is accessed at least during a period in which the voice mail message is being created.

10. The network according to claim 9, wherein a greeting precedes the voice mail message, and wherein at any time during the greeting or during a following period in which the first terminal is leaving a message, a listen-only connection from the mobile terminal to the first terminal is initiatable by activation of a hot key on the mobile terminal.

11. The network according to claim 10, wherein the mobile terminal comprises means to indicate whether the greeting is being played or the message is being recorded.

12. The network according to claim 10, wherein if the mobile terminal is to communicate with the first terminal, a second activation of the hot key on the mobile terminal initiates a two-way voice path with the first terminal.

13. The network according to claim 12, wherein creation of the voice mail message occurs in the voice mail system that is operatively coupled to the first terminal, and wherein after a provisionable delay, the voice mail system is disconnected from the first terminal.

14. The network according to claim 10, wherein if a decision is made for the mobile terminal not to establish communication with the first terminal, activation of an "End" button on the mobile handset terminates the listen-only connection.

15. The network according to claim 10, wherein creation of the voice mail message occurs in a voice mail system that is operatively coupled to the first terminal, and wherein if the mobile terminal waits until the first terminal hangs up, a two-way connection to the voice mail system is automatically set up to process the voice mail.

16. The network according to claim 9, wherein the apparatus further comprises a bridge operatively coupled between the mobile switching center and the voice mail system, and wherein the mobile terminal is operatively coupled to the bridge.

17. The network according to claim 9, wherein the apparatus further comprises at least one base station operatively coupled between the mobile terminal and the mobile switching system, and wherein the base station has a functionality that allows the mobile terminal to be operatively coupled to the voice mail system via the base station.

18. The network according to claim 9, wherein the first terminal is not aware that the mobile terminal is able to listen to the creation of the voice mail message in real time.

19. A network, comprising:
a mobile terminal operatively coupled to a mobile switching center via a base station;
a subscriber database operatively coupled to the mobile switching center;
a first terminal operatively coupled to the mobile switching center;
a voice mail system operatively coupled to the mobile switching center; and
a voice mail functionality whereby a voice mail message is created from the first terminal, and wherein the first terminal is accessible from the mobile terminal via a wireless connection from the base station to a wireless module of the voice mail system, and wherein the wireless connection bypasses the mobile switching center and does not require processing by the mobile switching center, and wherein the voice mail message is accessed at least during a period in which the voice mail message is being created; and
wherein the voice mail system comprises a greeting that precedes the voice mail message, and at any time during the greeting or during a following period in which the first terminal is leaving a message, a listen-only connection from the mobile terminal to the first terminal is initiated by an activation function on the mobile terminal; and wherein if the mobile terminal is to communicate with the first terminal, a further activation function on the mobile terminal initiates a two-way voice path with the first terminal.

20. The network according to claim 19, wherein the mobile terminal comprises a display that indicates when the greeting is being played or when the message is being recorded.

21. A computer-readable medium having computer executable instructions for performing steps, comprising:
   means for establishing a wireless connection from a base station to a wireless module of a voice mail system, wherein a voice mail message is being created on the voice mail system, and wherein the wireless connection bypasses a mobile switching center connected to the base station and does not require processing by the mobile switching center; and
   means for accessing a first terminal used to create the voice mail message during a period in which the voice mail message is being created.

22. An apparatus, comprising:
   a base station configured to wirelessly connect to a voice mail system via a wireless module of the voice mail system, wherein the wireless connection from the base station to the wireless module of the voice mail system bypasses a mobile switching center connected to the base station and does not require processing by the mobile switching center; and
   wherein the base station enables a user of a mobile terminal to access a first terminal used to create a voice mail message at least during a period in which the voice mail message is being created on the voice mail system.

23. The apparatus of claim 22, wherein the base station is configured to determine an address of a voice mail system associated with a particular called number.

24. The apparatus of claim 22, wherein the base station is configured to block traffic from the mobile terminal to the voicemail system.

* * * * *